Figure 1:
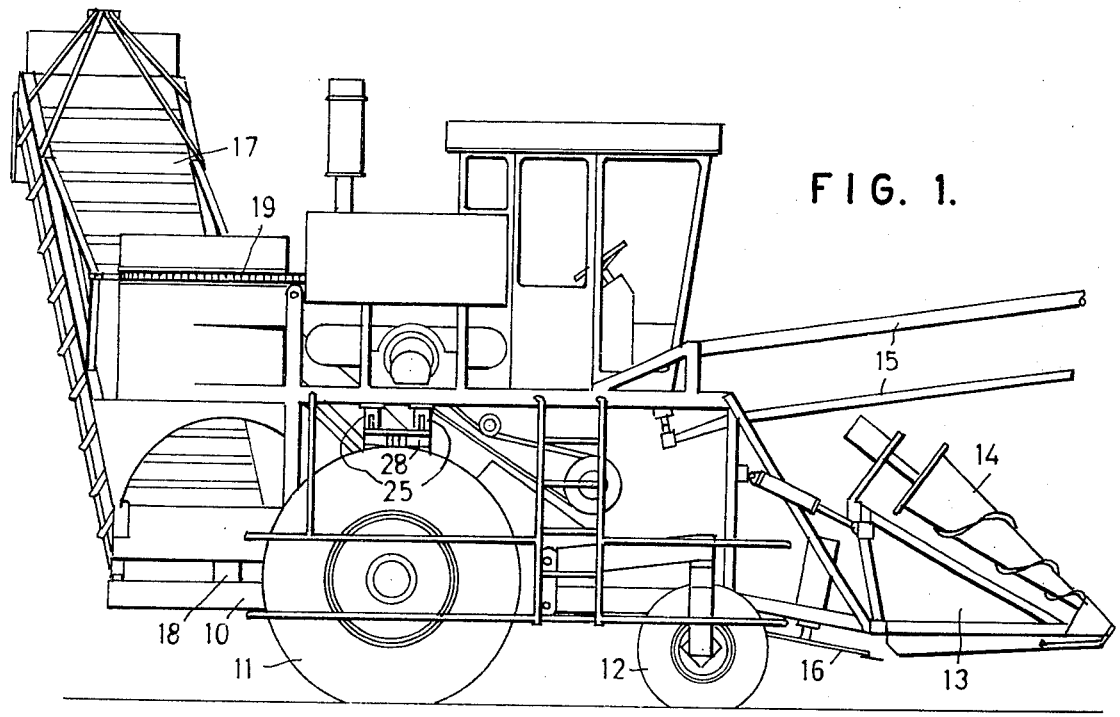

United States Patent [19]

Mizzi

[11] 3,921,374

[45] Nov. 25, 1975

[54] TILT CORRECTING DEVICE FOR A SUGAR CANE HARVESTER

[76] Inventor: Laurence Mizzi, P.O. Box 144, Ingham, Queensland 4850, Australia

[22] Filed: Dec. 6, 1973

[21] Appl. No.: 422,366

[52] U.S. Cl. ............... 56/208; 56/210; 56/DIG. 10; 56/10.2; 280/6.1; 280/111; 180/41
[51] Int. Cl.² .......................................... A01D 67/00
[58] Field of Search ............ 56/208, 209, 210, 212, 56/10.2, DIG. 10; 180/41; 280/6 R, 6 H, 6.1, 6.11, 111; 172/663, 666, 668

[56] References Cited
UNITED STATES PATENTS

| | | | |
|---|---|---|---|
| 2,790,648 | 4/1957 | Sweetland | 280/6 R |
| 3,325,982 | 6/1967 | Fogels et al. | 56/56 |
| 3,370,670 | 2/1968 | Love | 280/111 |
| 3,563,270 | 2/1971 | Denney et al. | 280/6.1 |
| 3,783,966 | 1/1974 | Campbell et al. | 280/111 |
| 3,792,748 | 2/1974 | Regier | 280/6.1 |

FOREIGN PATENTS OR APPLICATIONS

| 708,870 | 5/1954 | United Kingdom | 280/111 |
|---|---|---|---|

*Primary Examiner*—Robert Peshock
*Assistant Examiner*—James D. Hamilton
*Attorney, Agent, or Firm*—Donald D. Jeffery

[57] ABSTRACT

To correct lateral tilt of a sugar cane harvester, caused when the elevator at the rear of the harvester is swung to one side or the other, the rear wheels of the harvester are carried by a common axle which at one side is pivoted to the corresponding side of the main frame about an axis longitudinal with respect to the harvester, the other side of the main frame being raised or lowered, to correct tilt, by a hydraulic cylinder connected between the main frame and said pivoted axle.

1 Claim, 2 Drawing Figures

U.S. Patent   Nov. 25, 1975   3,921,374 ial view of a sugar cane har-
TILT CORRECTING DEVICE FOR A SUGAR CANE HARVESTER This invention relates to a tilt correcting device for a sugar cane harvester.

A well-known type of sugar cane harvester has a topping cutter for cutting the leafy tops of the cane as the harvester advances, a rotary base cutter for cutting the cane stalks at or near to ground level, a conveyor for carrying the topped and cut cane stalks butt ends first through the machine to a chopping cutter, which cuts the cane stalks into billets, and an elevator which receives the billets, and elevates and discharges, them, to be received in a bin on a mobile mounting drawn by a tractor. As the harvester works up and down succeeding rows of cane, the tractor hauling the receptacle must, of course, travel over ground already harvested and cleared of cane, and so the cane billets must be discharged first to one side of the harvester, and then to the other. The elevator, therefore, is normally pivoted about a vertical axis, and may be swung to one side or the other as required.

It has been proposed to provide a larger type harvester capable of simultaneously harvesting the cane from two succeeding rows. A difficulty in making such a harvester, however, is that when the elevator is swung to one side or the other, it causes the harvester to be tilted which, in the case of a single row harvester operating in normal conditions is not greatly disadvantageous. However, in the case of a two row harvester, having two laterally displaced base cutters for the two succeeding rows of cane, this tilt results in one of the base cutters being considerably lower than the other. Although the two base cutters may be adjustably raised or lowered simultaneously, to cut at required depth, when the machine is tilted to one side, one base cutter will be set to cut too high, the other too low.

The present invention has been devised to overcome the said present disadvantage by providing simple means whereby the lateral tilt caused by an elevator of a sugar cane harvester being swung to one side or the other may be corrected, the invention being applicable not only to a two-row harvester, but also advantageous in a single row harvester operating across sloping ground, or in conditions of very wet and yielding soil.

Accordingly, the invention resides broadly in a sugar cane harvester of the type having a main frame on a pair of rear drive wheels and a pair of front wheels, a base cutter assembly mounted vertically adjustably at the front of the main frame, adapted to cut cane as the harvester advances, and an elevator mounted on the rear of the main frame oscillatably about a vertical axis and adapted to elevate and discharge harvested cane to one side or the other of the rear of the main frame; wherein the rear wheels of the main frame are mounted on a common axle pivotally connected about a longitudinal axis to the main frame, and a hydraulic cylinder is connected operatively between the main frame and said axle to raise or lower one side of the main frame relative to the corresponding side of said axle.

Figure 2:
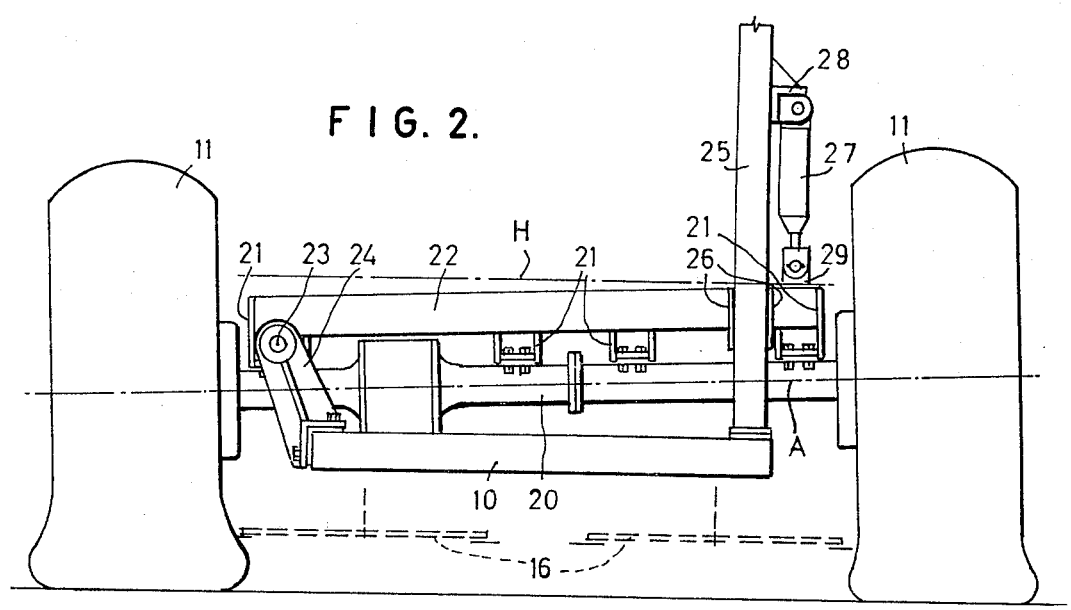

In the drawings:

FIG. 1 is a side elevational view of a sugar cane harvester having tilt correction apparatus according to the invention, and FIG. 2 is a rear view, to enlarged scale, of the tilt correction apparatus.

The harvester has a main frame 10 mounted on two rear drive wheels 11 and two steerable front wheels 12. In wellknown manner, the harvester has at the front a pair of pivotally adjustable forwardly extending crop-lifter arms 13 carrying driven rotary crop-lifters 14, for gathering and lifting cane of two succeeding rows; a topping cutter (not shown) mounted on forwardly extending parallel-motion arms 15 by which the topping cutter may be raised and lowered in parallelism, for cutting the leafy tops of the cane; and a pair of rotary base cutters 16, which may be adjustably raised or lowered, for cutting the cane stalks of the two rows at or near to ground level as the harvester advances. The cane so topped and cut is carried, butt ends first, through the machine by a conveyor (not shown) to a chopping cutter (not shown) which cuts the cane into billets which are delivered to an elevator 17, for elevating and discharging the billets. The elevator is mounted on the rear of the main frame oscillatably about a vertical axis at 18 and, by a chain drive at 19, may be swung to one side or the other, as from time to time required, to discharge the harvested cane into a receptable on a trailer, for example, drawn by a tractor over ground already harvested. As the harvester works alternately back and forth in the cane field, then, the elevator requires to be swung to one side and the other.

The drive wheels 11 are mounted on a rear axle 20 secured by mounting brackets 21 below a rear axle mount 22 which extends transversely above the rear part of the main frame 10.

At one side, the rear axle mount 22 is pivoted about a longitudinal axis on a pivot 23 carried by a pair of pivot brackets, one of which is shown at 24, secured to and extending upwardly from one side of the main frame 10. At the other side, the axle mount 22 is vertically movable between a pair of parallel standards 25 secured to and extending upwardly from that side of the main frame 10, the rear axle mount 22 being provided with bearer plates 26 to both sides of the standards 25.

A hydraulic cylinder 27 is pivoted to a bracket 28 mounted on the two standards 25, its piston being pivoted to a lug 29 secured to the side of the rear axle mount 22 which is engaged between the two standards.

In the operation of the harvester, when the elevator 17 is, as shown in FIG. 1, swung to one side of the rear of the harvester, the machine will be tilted down at that side, as shown in FIG. 2, in which the axis of the axle, indicated by chain broken line A, and also the rear axle mount 22, are tilted down to the left at an acute angle to horizontal, indicated by chain broken line H.

To counteract the corresponding tilt of the main frame 10, which would bring the two laterally spaced base cutters 16 to different working heights, the harvester operator operates the hydraulic cylinder 27 so that its piston retracts and, as shown, the right-hand side of the main frame 10 lowers, to bring the main frame to horizontal position, the two base cutters 16 therefore being at the same working height.

When the elevator is swung to opposite side, that is, to the right of the harvester, the hydraulic cylinder piston is extended, to raise the right-hand side of the main frame relative to the axle 20 which is tilted, by the weight of the elevator down to the right.

If the elevator 17 should be directed rearwardly, to discharge harvested cane to a receptacle drawn directly behind the harvester, the axle 20 will not be tilted, and the hydraulic cylinder 27 is therefore operated to bring the main frame to an intermediate horizontal position.

What I claim is:

1. A sugar cane harvester of the type having a main frame on a pair of rear drive wheels and a pair of front wheels, a base cutter assembly mounted vertically adjustably at the front of the main frame and adapted to cut cane as the harvester advances, and an elevator mounted on the rear of the main frame oscillatably about a vertical axis and adapted to elevate and discharge harvested cane to one side or the other of the rear of the main frame; wherein the rear wheels of the main frame are mounted on a common axle located above said main frame and secured to and below a rear axle mount, said rear axle mount being pivotally attached at one end to a longitudinally extending pivot pin carried by brackets secured to and extending upwardly from said main frame, with the other end of said mount being vertically movably guided between standards secured to and extending upwardly from that side of the main frame, and a hydraulic cylinder connected operatively between the main frame and said axle to raise or lower one side of the main frame relative to the corresponding side of said axle.

* * * * *